(12) United States Patent
Kohl et al.

(10) Patent No.: US 7,142,341 B2
(45) Date of Patent: Nov. 28, 2006

(54) ACTUATOR FOR AN OPTICAL-MECHANICAL SCANNER AND A METHOD OF USING THE ACTUATOR

(75) Inventors: Manfred Kohl, Karlsdorf-Neuthard (DE); Koyoshi Yamauchi, Sendai (JP); Makoto Ohtsuka, Sendai (JP); Toshiyuki Takagi, Sendai (JP)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 273 days.

(21) Appl. No.: 10/883,596

(22) Filed: Jul. 1, 2004

(65) Prior Publication Data

US 2004/0246555 A1 Dec. 9, 2004

Related U.S. Application Data

(63) Continuation-in-part of application No. PCT/EP03/02382, filed on Mar. 8, 2003.

(30) Foreign Application Priority Data

Mar. 27, 2002 (DE) ................ 102 13 671

(51) Int. Cl.
*G02B 26/08* (2006.01)
(52) U.S. Cl. ........................ 359/224; 359/198

(58) Field of Classification Search ............ None
See application file for complete search history.

(56) References Cited

U.S. PATENT DOCUMENTS 5,982,521 A * 11/1999 Bessho et al. .......... 359/198
6,057,947 A 5/2000 Hobbs et al.

FOREIGN PATENT DOCUMENTS

| DE | 197 21 349 | 12/1999 |
|---|---|---|
| JP | 08 122679 | 5/1996 |
| JP | 08 262364 | 10/1996 |
| WO | WO 01/16484 | 3/2001 |

* cited by examiner

*Primary Examiner*—James Phan
(74) *Attorney, Agent, or Firm*—Klaus J. Bach

(57) ABSTRACT

In an actuator for an optical mechanical scanner comprising a positioning element for an optical mirror wherein the positioning element is an electrically heatable flexible element consisting of a shape memory alloy having a Curie temperature and a transformation temperature, and wherein the flexible element is ferromagnetic when cold and can be bent in a first position by a magnet but is heated to exceed the Curie temperature and the transformation temperature so as to become paramagnetic whereby the flexible element becomes deformed in the opposite direction.

7 Claims, 2 Drawing Sheets

ACTUATOR FOR AN OPTICAL-MECHANICAL SCANNER AND A METHOD OF USING THE ACTUATOR

This is a Continuation-In-Part application of International application PCT/EP03/02382 filed Mar. 8, 2003 and claiming the priority of German application 102 13 671.8 filed Mar. 27, 2002.

BACKGROUND OF THE INVENTION

The invention resides in an actuator for an optical-mechanical scanner and a method of using the actuator.

Optical-mechanical scanners are used in reading devices for the identification of bar codes (barcode scanners). The operation of such scanners is based essentially on the photo-technical scanning of a surface area to be identified with a periodically deflected light beam which is focused onto the surface area for achieving a resolution as required for a particular application. The time-dependent pattern of the reflected light is then received by a photo-electric receiver and converted into electrical signals. From the time-dependent pattern of these signals, the surface area to be identified is reconstructed.

Optical-mechanical scanners therefore comprise a unit for the deflection of the beam, which is based on different operational principles. Important for the arrangement is the intended application. If a scanner is intended for scanning text or even color images with high resolution, the beam deflection occurs generally by way of relatively slow mechanical devices over a large area. In contrast, scanners which are used for example in cash registers for the identification of bar codes must be able to detect the coded information rapidly, that is, in a single scanning procedure although with relatively low, but still sufficient lateral resolution. In this application, there is no need to involve the whole of a surface area by way of several staggered scanning procedures. However, in all devices, for the deflection of the beams, the light beam must be moved over the object being scanned in a uniform manner.

At the end of the description literature [1] to [6] is listed. In [1] a device for the beam deflection is described which is considered to be the technically and economically best solution and which is used in almost all optical-mechanical scanners suitable for the photo-technical scanning of a barcode. It consists of a rotating polygonal mirror with several planar mirror surfaces, onto which a light beam from a laser diode is directed sequentially with the direction of rotation of the rotating mirror surfaces. The laser beam is consequently reflected onto the barcode with twice the circumferential speed and the process is repeated with each mirror surface area reaching the laser beam. As scanning frequency [1] a range of 200 to 800 Hz and as usable scan angle, an angle of 58° are indicated.

Another device of this type is disclosed in [2].

In connection with handheld scanners for scanning bar codes, but also for other scanners, particularly mobile text scanners, a miniaturization of the beam deflection device is desired.

Devices for the beam deflection using rotating polygonal mirrors however do not appear to be very suitable herefo because of the necessary drive means. New concepts circumventing this limitation are based on devices with actuators utilizing electromagnetic, magneto-restrictive or electrostatic effects for the beam deflection.

In this connection [3] discloses a device for the beam deflection by means of a magneto-strictive actuator which carries a mirror surface and vibrates in a resonance mode. The magnetic field which is generated by two Helmholtz coils acts herein on a cantilever bimorph resonator. As scanning frequency, a range of 10 to 50 kHz with a usable scanning angle of 24° is indicated.

In [4] and [5] alternative arrangements for the beam deflection by micro-actuators utilizing electrostatic [4] or electromagnetic [5] forces are described. Also those actuators act like spring-mass systems whose amplitude-frequency characteristics are characterized by a high frequency dependdecy, by different oscillation modes and by secondary resonances.

It is the object of the present invention to provide an actuator for the beam deflection in an optical-mechanical scanner and a method of using such an actuator wherein particularly the disadvantages caused by spring-mass systems are avoided to a large extent.

SUMMARY OF THE INVENTION

In an actuator for an optical mechanical scanner comprising a positioning element for an optical mirror wherein the positioning element is an electrically heatable flexible element consisting of a shape memory alloy having a Curie temperature and a transformation temperature and the flexible element is ferromagnetic when cold and can be bent in a first position by a magnet but is heated to exceed the Curie temperature and the transformation temperature so as to become paramagnetic whereby the flexible element becomes deformed in the opposite direction.

Preferably, the shape memory alloy is a NiMnGa alloy. The operating element is a flexible element which is firmly mounted at one end thereof and carries at its opposite end an optical mirror by which a light beam is deflected and which oscillates back and forth with the flexible element. When exceeding the Curie temperature of the shape memory alloy the magnetic properties change from a ferromagnetic to a paramagnetic state.

If the shape memory alloy combination of the flexible element is so selected that the Curie temperature that is, the transition from a modification with ferro- to one with paramagnetic properties is only slightly above the predetermined operating temperature, a change of the magnetic properties can be initiated by moderate temperature changes about the Curie temperature. A flexible element consisting of this material can therefore be excited in a permanent magnetic field. The temperature changes could be provided discontinuously directly by a flow of current through the shape memory alloy or in a cyclical manner.

Shape memory alloys furthermore have a conversion temperature wherein, upon exceeding this temperature, a martensite modification is converted to an austenite modification and in this modification the memory alloys assume a memorized shape (one-way effect). In contrast to the austenite modification, with the one way effect, in the martensite modification there is no memorized shape. The one-way effect can be utilized in connection with the invention in that, by cyclically passing the conversion temperature, the flexible element can be switched back and forth between two positions which are given by the memorized shape and the shape of the flexible element in the martensite modification to act thereby as an actuator. For beam deflection actuators in an optical-mechanical scanner, a larger scan angle could be achieved thereby, which would be very advantageous for such scanners.

It would also be possible to utilize the so-called two-way effect wherein a memory shape is also present in the martensite modification. This is therefore a special case of the one-way effect.

Instead of the flexible element, a torsion element may be used as an actuator which performs a rotational movement upon passing of the conversion temperature.

In a particularly advantageous embodiment, the flexible member forming the actuator consists of a shape memory alloy, whose Curie-temperature and conversion temperature are disposed within a very small window above the operating temperature. In this way, the two effects mentioned above can both be utilized in parallel.

By utilizing these two effects in a flexible element, that is, the shape memory effect for the displacement of the flexible element in one direction and the magnetic effect in the reverse direction, a particularly advantageous bi-directional active displacement (antagonism) is achieved. At the same time, the return force of the respective antagonist during displacement is decreased (negative return force-reverse biasing). With the utilization of the shape memory effect (memorized shape) above the conversion temperature in a forward direction, the magnetic return force to a large extent is eliminated by the setting of the paramagnetic modification in the flexible element above the Curie temperature. Below the conversion temperature, the shape-memory alloy loses its predetermined shape, but has ferromagnetic properties below the Curie temperature. The shape memory effect is consequently eliminated and the bend actuator is deflected by the outer magnetic field in the opposite direction. This mechanism provides in a particularly advantageous manner, for very high actuator forces in both directions and therefore for large deflections of the bend actuator providing for large scanning angles.

The dynamics of the actuator movement is determined alone by the heat transfer times and the width of the temperature window for the Curie temperature and the conversion temperature. It is apparent that, in order to ensure short heat transfer times, the flexible element should have a high specific surface. Flow dynamic conditions further have the result that the heat transfer time becomes smaller with the component size.

As a reasonably achievable temperature window for sufficiently dynamics a value of about 30° C. has been found appropriate. As shape memory alloys, which can comply with this criterium, NiMnGa alloys which consist of 50–54 at % Ni, 23–25 at % Mn, and 21–25 at % Ga are particularly suitable. Table 1 shows the conversion temperatures measured and the Curie temperature $T_c$ for two sheets or strips manufactured by a PVD sputter process, wherein A comprises the area of conversion from martensite to an austenite modification during a heating step and M gives the area of the transition from the austenite to the martensite modification during cooling. With the two shape memory alloys represented, the Curie temperature $T_c$ is, in a particularly advantageous manner, between the transition temperatures A and M, which consequently quantify the temperature window.

TABLE 1

Transition temperatures M and A as well as Curie temperature $T_c$ for metal sheets of $Ni_{54}$, $Mn_{24,1}$ $Ga_{21,9}$ and of $Ni_{53,6}$ $Mn_{23,4}$ $Ga_{23,0}$ manufactured by a PVD sputter process.

| Sample | Sputter Power W | A [K] | M [K] | T [K] |
|---|---|---|---|---|
| $Ni_{54,0}$ $Mn_{24}$ $Ga_{21,9}$ | 50 | 387–397 | 365–373 | 376 |
| $Ni_{53,6}$ $Mn_{23,4}$ $Ga_{23,0}$ | 400 | 340–350 | 335–338 | 345 |

The dynamics of the movement depend to a large degree on the hysteresis behavior of the shape memory alloys during the passage of the transition temperature (the hysteresis width corresponds to the difference between A and M) and the Curie temperature. Basically, a small hysteresis is advantageous for the dynamics.

As the frequency up to which an operation with frequency independent amplitude is possible, the upper limit frequency of the elastic element is mentioned. In order to avoid resonance effects, this frequency however must be below the resonance frequency of the elastic element.

Above this limit frequency, the maximum amplitude becomes lower with increasing frequency because of the increasing influence of the thermal inertia. Small flexible elements have naturally higher resonance frequencies and high limit frequencies.

It is therefore apparent that the actuator according to the invention is particularly suitable as a microactuator. Such an actuator can be advantageously integrated in microelectronic devices, for example, as a component in portable devices. Another advantage results from the parallel manufacturing possibilities in micro-manufacturing techniques whereby manufacturing expenditures and costs are substantially reduced particularly in large volume manufacturing.

The invention will be described below in connection with two embodiments on the basis of the accompanying drawings.

BRIEF DESCRIPTION OF THE DRAWINGS

FIG. 1 shows a first embodiment of an actuator according to the invention, an

DESCRIPTION OF THE PREFERRED EMBODIMENTS

Figure 1:
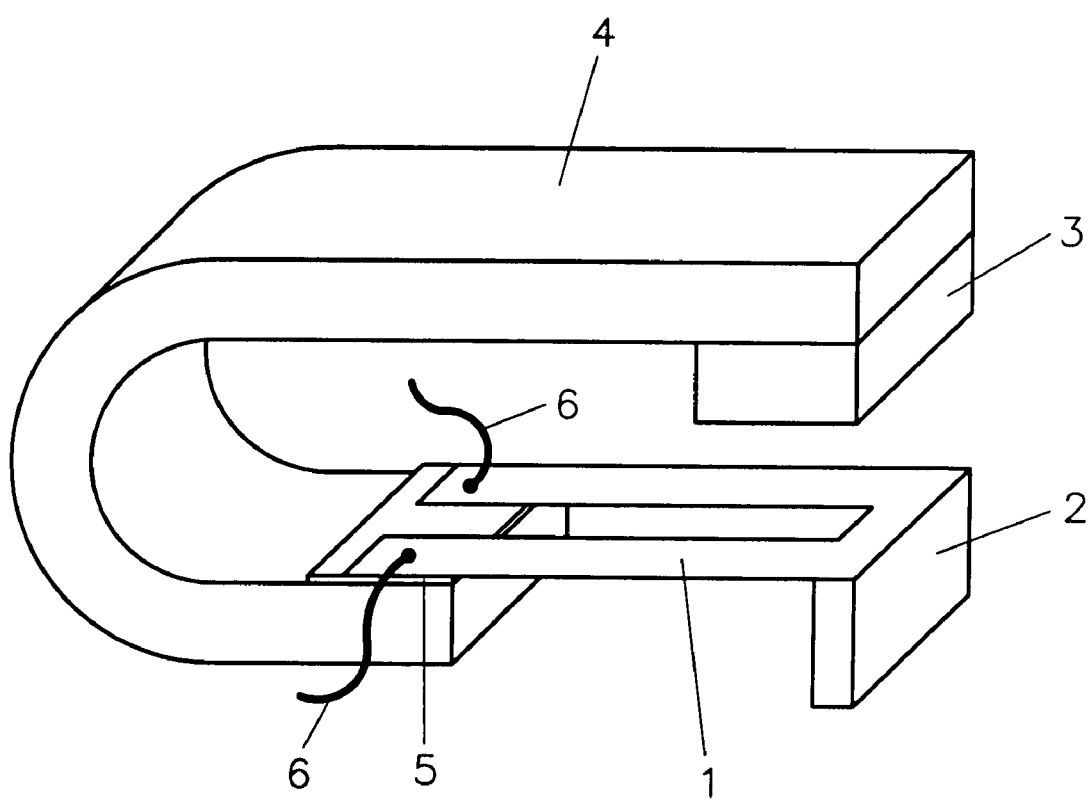

The actuator for an optical-mechanical scanner as shown in FIG. 1 consists essentially of a flexible element 1, a microscopic mirror 2, a magnet 3 of high permanent field strength and a support structure 4. The support structure 4 of this embodiment comprises a U-shaped metal strip with two straight parallel legs of different length. The flexible element 1 comprises a U-shaped thin sheet of a shape memory alloy which is attached with its two legs in a suitable manner flat to the inside of the shorter leg of the support structure 4. Preferably, the flexible element extends parallel to the longer leg of the support structure and about to the same extent as the longer leg. The inner ends of the flexible element legs each include an electrical connection 6 and are electrically insulated with respect to the support structure by an insulation layer 5. At the free end of the flexible element 1, the mirror 2 is mounted so that it is pivotable together with the flexible element. The mirror surfaces of the mirror 2 can be arranged parallel with the flexible element or normal thereto depending on the design of the optical-mechanical scanner. The magnet 3 is a permanent magnet and is arranged at the inside of the longer leg of the support structure 4.

By way of the electrical connection 6, an electric current is conducted to the inner ends of the flexible element 1 whereby the flexible element is heated directly by the current flow to a temperature above the Curie temperature and above the transition temperature. As a result, the flexible element loses its ferromagnetic properties and assumes a predetermined curvature that is a memorized shape, in which, in accordance with the setup described above as antagonism, it is oriented away from the magnet 3. When the current flow is interrupted the shape memory alloy of the flexible element cools down so that its temperature drops below the Curie temperature and below the transition temperature whereby the memorized curvature orientation is eliminated and, at the same time, the flexible element becomes again ferromagnetic so that it is attracted by the permanent magnet 3.

The antagonism is increased if the support structure 4 consists of a soft magnetic material. Then a magnetic circuit is formed which extends from the magnet 3 through the support structure 4 to the flexible element 1.

Figure 2:
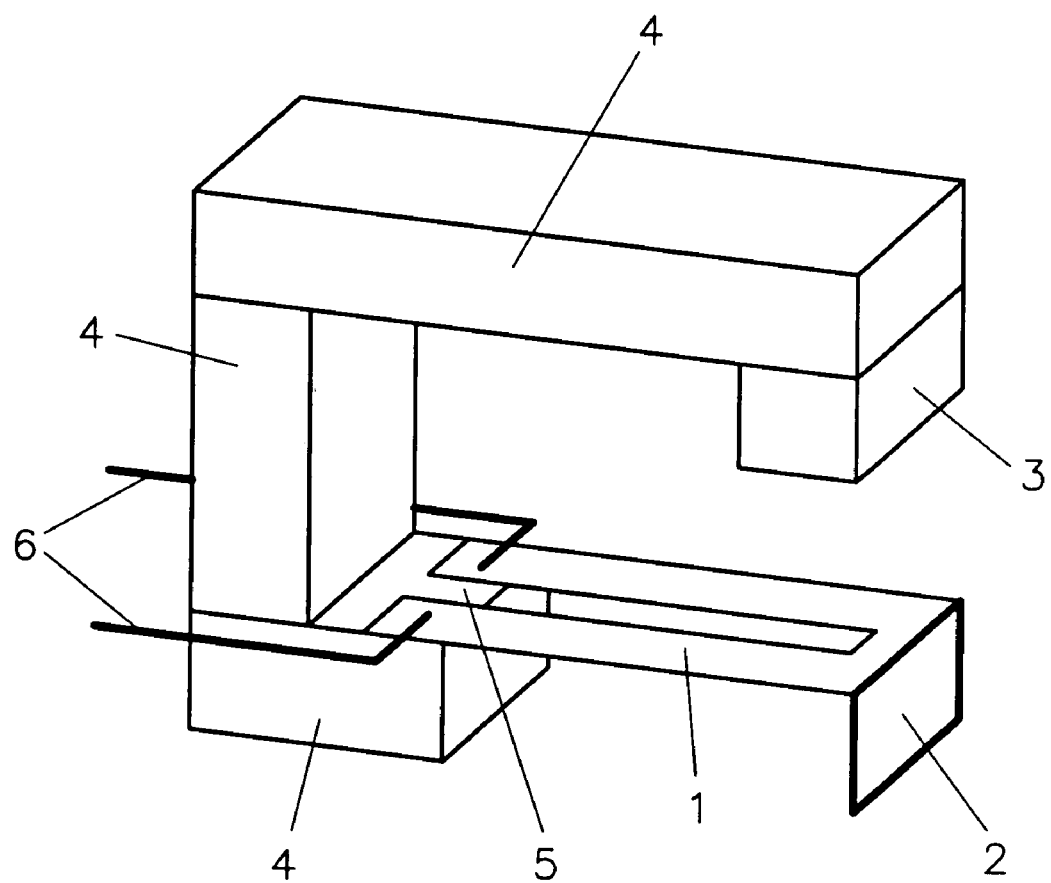
FIG. 2 shows a second embodiment of the actuator.

In the arrangement as shown in FIG. 2, the support structure 4 is assembled from several components rather than being formed by a V-shaped metal strip. Such an arrangement is advantageous particularly for actuators which are manufactured by micro-engineering manufacturing methods.

In this second embodiment, the device has a height of for example, 5.3 mm, a width of 3 mm and a length of 9 mm. The flexible element has a lateral extension of 6.0×2.5 mm and consists of a 20 μm thick NiMnGa metal plate, which, after the certain curvature has been generated in a thermo-mechanical way above the Curie temperature, is mounted on the support structure 4 by way of Kaptan foil serving as insulation 5. The Ni Mn Ga metal strip can be manufactured by a magnetron sputtering process that is by a PVD process. For the transfer of the flexible element 1 to the support structure 4 a lift-off procedure may be utilized as described for example in [6], which permits the transfer of micro-structured functional layers in a highly precise manner. The electrical connections are established on the flexible element either by a soldering or spot welding procedure or by wire bonding.

The upper limit frequency and therefore the scanning frequency is in the exemplary embodiment with the given dimensions with convection cooling and periodic oscillation movement at about 50 Hz, the achievable scanning angle is about 50°.

In a third alternative embodiment, the magnet is integrated into the support structure.

LITERATURE

[1] Runge, W.: Zebrastreifen im Laserfokus, Optikentwicklung für einen Barcode-Scanner; F&M Optik, Jahrgang 108 (2000) 12, S44–46

[2] DE 196 06 831 A1
[3] Garnier, A. et al.: A fast, robust ans dimple 2-D micro-optical scanner based on contactless magnetostrictive actuation; Proc. MEMS 00, Miyazaki, Japan (2000)
[4] Conant, R. A. et al.: A raster-scanning full-motion video display using polysilicon micromachined mirrors, Proc. Transducers 99, Sendai, Japan (1999), S.376–379
[5] Kunz, Th. et al.: Electromagnetic microactuators for optical applications; Proc. Actuator 2000, Bremen, Germany (2000), S. 355–358
[6] DE 198 21 841

What is claimed is:

1. An actuator for an optical-mechanical scanner with an operating element for an optical mirror, said operating element being a flexible member consisting of a shape memory alloy having a Curie temperature and a transition temperature from a martensite to an austenite phase above an operating temperature wherein, above the Curie temperature and the transition temperature, said flexible member has a pre-imposed memory shape and paramagnetic properties, and below the Curie temperature, the flexible member has ferromagnetic properties, the flexible member being so formed that a return force into a previously imposed memory shape and a force generated by the magnetic field in opposite direction are effective on the flexible element.

2. An actuator according to claim 1, wherein said operating element is one of a bending and torsion element.

3. An actuator according to claim 1, wherein:
   a) the flexible member comprises a U-shaped metal strip of an NiMnGa alloy having spaced legs whose first ends are mounted on said support structure in an electrically insulated manner and at whose free joined ends a mirror is disposed for a beam deflection,
   b) electrical connectors are attached to the free ends of the legs of the flexible member for electrically heating the flexible element directly by passing an electric current therethrough, and
   c) permanent magnet is arranged on said support structure opposite the end of said legs of said flexible member for generating a magnetic field.

4. An actuator according to claim 3, wherein said support structure is a U-shaped metal structure comprising one of a bent structure and a structure assembled of several components, said metal structure having two parallel legs, one supporting said flexible member and the other supporting said permanent magnet.

5. An actuator according to claim 4, wherein
   a) said support structure consists of a soft magnetic material and forms with the flexible member and the permanent magnet a magnetic circuit, and
   b) an electric insulation is provided between the flexible member and the support structure.

6. An actuator according to claim 1, wherein said Curie temperature and said transition temperature are in a temperature window of 30° C.

7. An actuator according to claim 1, wherein said shape memory alloy consists of 50–54 at % Ni, 23–25 at % Mn and 21–25 at % Ga.

* * * * *